(12) United States Patent
Stricker et al.

(10) Patent No.: US 10,616,376 B2
(45) Date of Patent: Apr. 7, 2020

(54) COMMUNICATIONS PROTOCOL

(71) Applicant: Vivint, Inc., Provo, UT (US)

(72) Inventors: Jimmy Stricker, Herriman, UT (US); Ryan Carlson, South Jordan, UT (US)

(73) Assignee: Vivint, Inc., Provo, UT (US)

( * ) Notice: Subject to any disclaimer, the term of this patent is extended or adjusted under 35 U.S.C. 154(b) by 22 days.

(21) Appl. No.: 15/215,221

(22) Filed: Jul. 20, 2016

(65) Prior Publication Data

US 2018/0027095 A1    Jan. 25, 2018

(51) Int. Cl.
*H04L 29/06* (2006.01)

(52) U.S. Cl.
CPC .................................. *H04L 69/04* (2013.01)

(58) Field of Classification Search
None
See application file for complete search history.

(56) References Cited

U.S. PATENT DOCUMENTS

| | | | | |
|---|---|---|---|---|
| 6,100,824 A | * | 8/2000 | MacLeod | H03M 7/3088 341/106 |
| 8,914,526 B1 | * | 12/2014 | Lindquist | H04L 29/06 709/229 |
| 9,401,975 B2 | * | 7/2016 | Hori | H04W 28/18 |
| 9,559,720 B2 | * | 1/2017 | Marwah | |
| 9,648,145 B2 | * | 5/2017 | Suzuki | H04L 69/04 |
| 2002/0029341 A1 | * | 3/2002 | Juels | G06F 21/36 713/184 |
| 2002/0057716 A1 | * | 5/2002 | Svanbro | H03M 7/30 370/477 |
| 2003/0090418 A1 | * | 5/2003 | Howell | H01Q 3/26 342/377 |
| 2005/0014494 A1 | * | 1/2005 | Owen | G06F 17/30569 455/419 |
| 2005/0286566 A1 | * | 12/2005 | Tong | H04L 1/0057 370/503 |

(Continued)

FOREIGN PATENT DOCUMENTS

EP    1262931 A1    12/2002

OTHER PUBLICATIONS

Das, S.R., et al., "Home Automation and Security for Mobile Devices," Pervasive Computing and Communications Workshops (PERCOM Workshops), IEEE International Conference, Mar. 25, 2011.

*Primary Examiner* — Khaled M Kassim
(74) *Attorney, Agent, or Firm* — Holland & Hart, LLP

(57) ABSTRACT

The disclosure may relate to a communications protocol between a mobile device and a control panel, or a mobile device and a server associated with the automation system. The communication protocol may reduce a size of data transferred between the mobile device and control panel ensuring the user does not experience latency on their mobile device, a large bill from their wireless broadband provider, and also does not miss important update or the like from the automation system. In some embodiments, a method for a security and/or automation is described. The method may comprise generating a communication to a user, coding the communication using a pre-established user-specific code index, and transmitting the coded communication to a device associated with the user. Coding the communication may further comprise reducing a size of the communication.

20 Claims, 12 Drawing Sheets

(56) References Cited

U.S. PATENT DOCUMENTS

| | | | |
|---|---|---|---|
| 2008/0095258 A1* | 4/2008 | She | H04L 1/0675 375/262 |
| 2008/0256510 A1* | 10/2008 | Auerbach | G06F 8/30 717/107 |
| 2008/0293443 A1* | 11/2008 | Pettinato | G06F 9/542 455/466 |
| 2008/0294434 A1* | 11/2008 | Pettinato | G06F 9/542 704/235 |
| 2009/0201544 A1* | 8/2009 | Kumakura | H04N 1/32122 358/1.15 |
| 2010/0094649 A1* | 4/2010 | White | G06F 19/324 705/2 |
| 2010/0121968 A1* | 5/2010 | Clark | H04L 12/2818 709/230 |
| 2010/0281079 A1* | 11/2010 | Marwah | H03M 7/30 707/812 |
| 2011/0281560 A1* | 11/2011 | Chouhan | G06Q 10/107 455/412.1 |
| 2012/0033809 A1* | 2/2012 | Huang | H04L 9/001 380/46 |
| 2012/0039534 A1* | 2/2012 | Malik | H03M 7/3064 382/173 |
| 2013/0060904 A1* | 3/2013 | Ur | H04L 67/06 709/219 |
| 2013/0173248 A1 | 7/2013 | Curzi et al. | |
| 2013/0262703 A1* | 10/2013 | Dong | H04L 47/38 709/247 |
| 2013/0289750 A1* | 10/2013 | Souvay | H05B 37/0263 700/90 |
| 2013/0294487 A1* | 11/2013 | Kim | H04L 1/0009 375/219 |
| 2013/0339745 A1* | 12/2013 | Gramelspacher | G06F 21/335 713/183 |
| 2014/0132594 A1* | 5/2014 | Gharpure | G06T 15/205 345/419 |
| 2014/0184743 A1* | 7/2014 | Chen | H04N 13/0007 348/43 |
| 2014/0309789 A1* | 10/2014 | Ricci | B60Q 1/00 700/276 |
| 2014/0351229 A1* | 11/2014 | Gupta | G06F 17/30153 707/693 |
| 2015/0085876 A1* | 3/2015 | Chhatriwala | H04W 28/06 370/465 |
| 2016/0044140 A1* | 2/2016 | Suzuki | H04L 69/04 370/477 |
| 2016/0173886 A1* | 6/2016 | Bae | H04N 19/172 382/166 |
| 2017/0237986 A1* | 8/2017 | Choi | H04N 19/132 348/14.02 |

\* cited by examiner

COMMUNICATIONS PROTOCOL

BACKGROUND

The present disclosure, for example, relates to security and/or automation systems, and more particularly to reduce a size of communications between an automation system and a mobile device.

Security and automation systems are widely deployed to provide various types of communication and functional features such as monitoring, communication, notification, and/or others. These systems may be capable of supporting communication with a user through a communication connection or a system management action.

Automation systems may communicate with users when the users are remote from the system and/or the control panel. The user may link a mobile device such as a cell phone to the automation system. The automation system may send and/or receive alerts, commands, and the like between the mobile device and the control panel. The user may subscribe to a wireless broadband service, or a data plan. The continuous messaging between the control panel, automation system, and the mobile device may require a large amount of data. The message may consume a limitation on the user's data transfer plan, slow down the transfer rate of data for a user, and the like. If a user consumes a greater amount of data than their allotment, the user may experience a large invoice from their wireless broadband provider.

SUMMARY

The disclosure may relate to a communications protocol between a mobile device and a control panel, or a mobile device and a server associated with the automation system. The communication protocol may reduce a size of data transferred between the mobile device and control panel ensuring the user does not experience latency on their mobile device, a large bill from their wireless broadband provider, and also does not miss important update or the like from the automation system.

In some embodiments, a method for a security and/or automation is described. The method may comprise generating a communication to a user, coding the communication using a pre-established user-specific code index, and transmitting the coded communication to a device associated with the user. Coding the communication may further comprise reducing a size of the communication.

In some embodiments, the method may comprise generating a code index, wherein the code index is user-specific. The method may include determining when the device is connected to a wireless network and transferring the code index to the device associated with the user based at least in part on the determining In some instances, the method may include receiving an incoming coded communication from the device and decoding the incoming coded communication using a code index. The decoded communication may be transferred to a module within the control panel and the decoded communication may be executed, by the module. The communication comprises one or more communications between the automations system and the user.

An apparatus for a security and/or automation system is described. The apparatus may include a processor, memory in electronic communication with the processor, and instructions stored in the memory. The instructions may be executable by the processor to generate a communication to a user, code the communication using a pre-established user-specific code index, and transmit the coded communication to a device associated with the user.

Another method for a security and/or automation system is described. The method may include generating a communication to a control panel, coding the communication using a locally stored code index, and transmitting the coded communication to the control panel.

The method may further include connecting to a Wi-Fi connection, establishing a connection to the control panel, downloading a code index, and storing, locally, the downloaded code index. In further embodiments, the method may comprise connecting to a Wi-Fi connection, establishing a connection to the control panel, and updating the locally stored code index. Coding the communication may further comprise reducing a size of the communication. The method may include receiving an incoming coded communication from the control panel and decoding the incoming coded communication using the locally stored code index. The decoded message may be displayed to the user.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Security and/or automation systems often communicate with a user remotely through the use of a mobile device. The user may have a cellular plan that services the mobile device and the cellular plan may comprise a data plan. The data plan may comprise a limit of allowable data transfer per a predetermined period. A communication protocol system for an automation system may reduce the size of a communication and the cumulative data transferred between a mobile device and an automation system without reducing the number of messages between the automation system and the mobile device. The communication protocol may maintain an effective communication and messaging system between the automation system and the mobile device. The communication protocol may be specific to an individual user or to an automation system.

The communication protocol system may develop a coding system specific to the automation system. The coding system may comprise a catalog of phrases and commands. The phrases and commands may be generic, unique to the automation system, or a combination thereof. The phrases and commands may be associated with an abbreviated coding system such that the phrases and/or commands are shortened. For example, the phrase "Alarm Security System" may be reduced to at least a two symbol identifier. The two symbol identifier may be numeric, alphabetical, alphanumeric, or the like.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
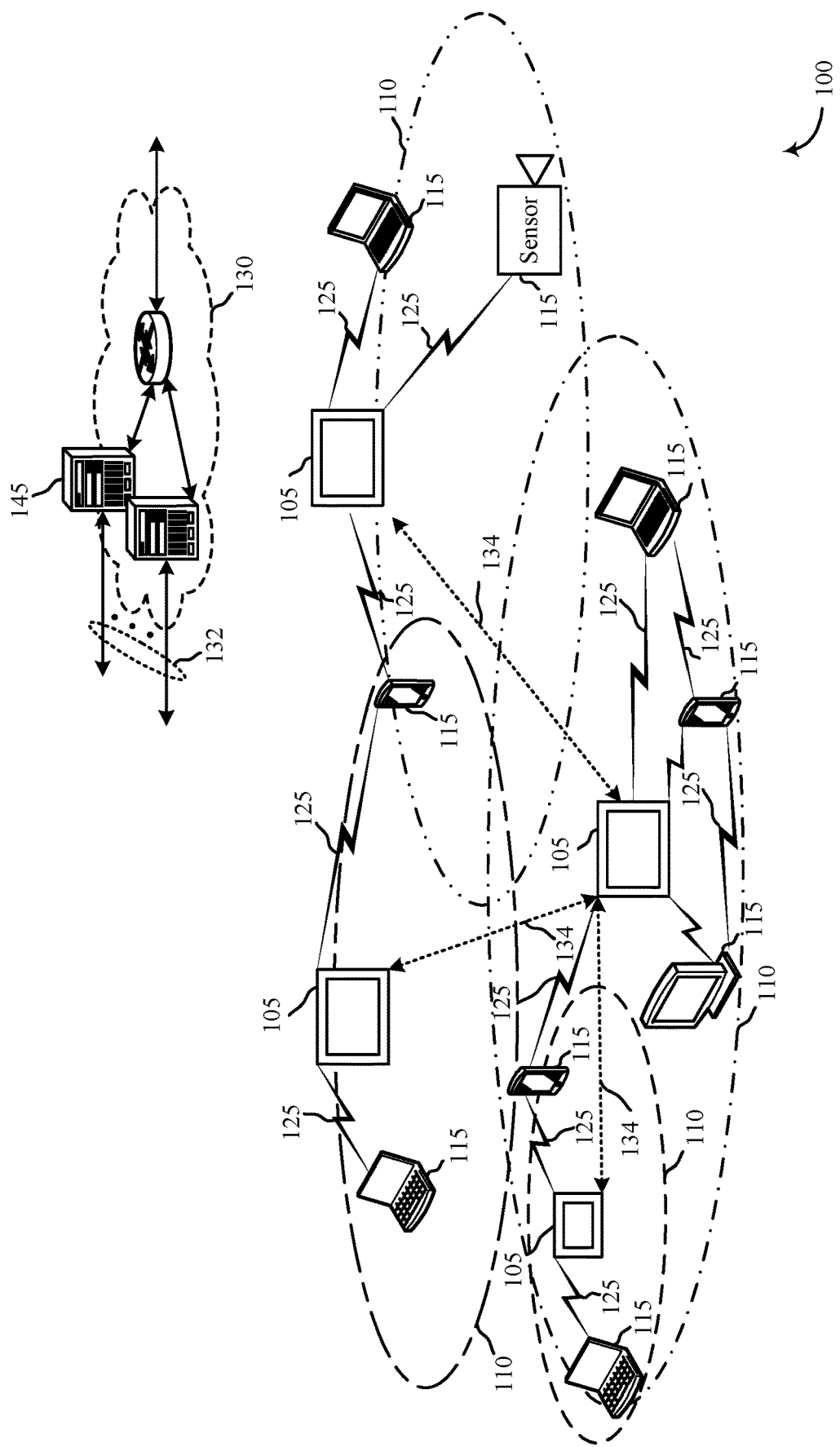
FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include control panels 105, devices 115, and/or a network 110. The network 110 may provide user authentication, encryption, access authorization, tracking, Internet Protocol (IP) connectivity, and other access, calculation, modification, and/or functions. The control panels 105 may interface with the network 110 through wired and/or wireless communication links 112 to communicate with one or more remote servers 145. The control panels 105 may perform communication configuration, adjustment, and/or scheduling for communication with the devices 115, or may operate under the control of a controller. In various examples, the control panels 105 may communicate—either directly or indirectly (e.g., through network 110)—with each other over wired and/or wireless communication links 112. Control panels 105 may communicate with a back end server (such as the remote servers 145)—directly and/or indirectly—using one or more communication links.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 are dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, and/or the like. A device 115 may also include or be referred to by those skilled in the art as a user device, a sensor, a security camera, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. A device 115 may include and/or be one or more sensors that sense: proximity, motion, temperatures, humidity, sound level, smoke, structural features (e.g., glass breaking, window position, door position), time, geo-location data of a user and/or a device, distance, biometrics, weight, speed, height, size, preferences, light, darkness, weather, time, system performance, and/or other inputs that relate to a security and/or an automation system. A device 115 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 112. Two or more devices 115 may communicate via a direct communication link 112 when both devices 115 are in the geographic coverage area 110 or when one or neither devices 115 is within the geographic coverage area 110. Examples of direct communication links 112 may include Wi-Fi Direct, BLUETOOTH®, wired, and/or and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

Figure 2:
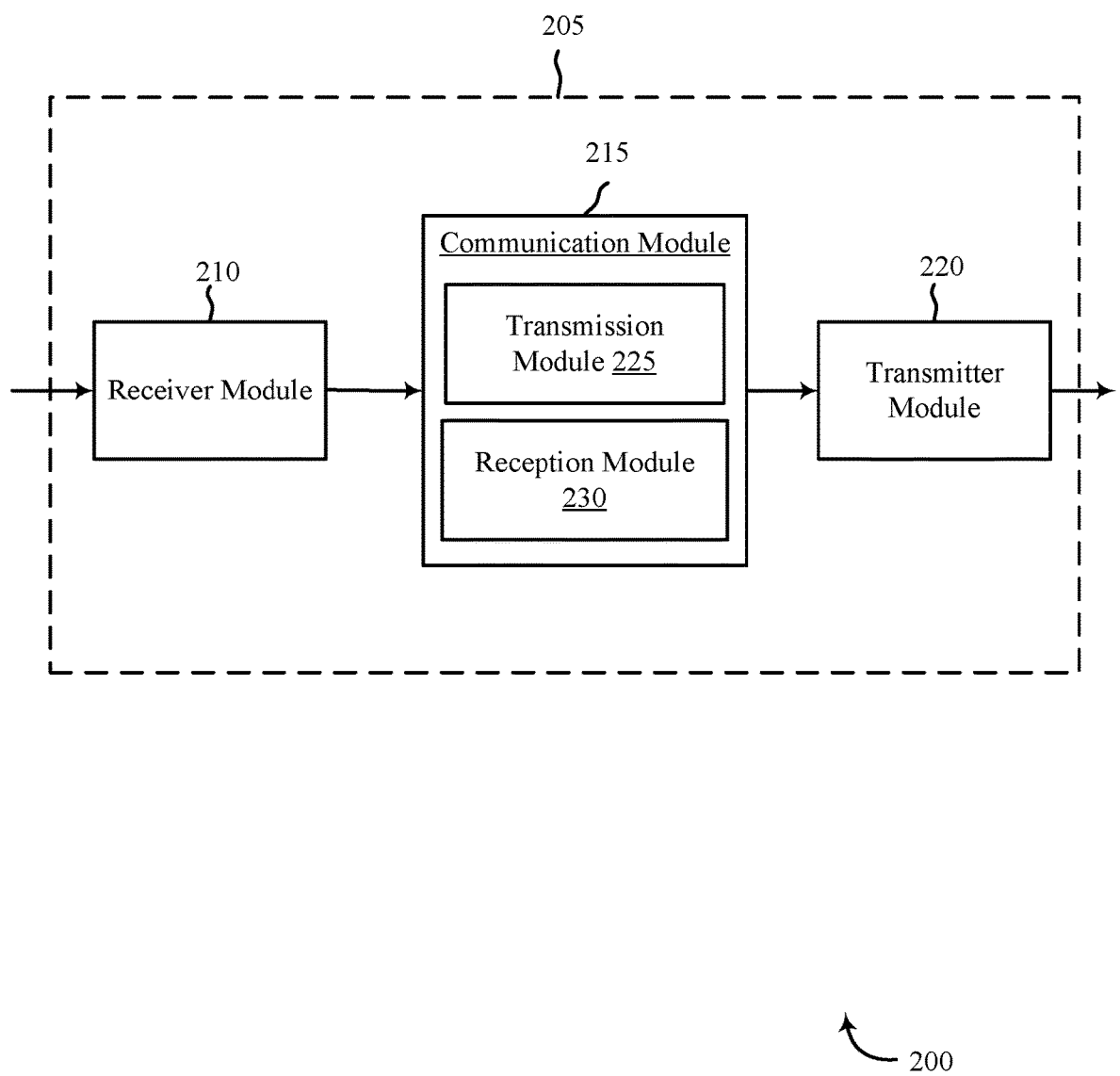
FIG. 2 shows a block diagram of a device relating to a security and/or an automation system, in accordance with various aspects of this disclosure.

The mobile device 115 may communicate one or more commands to the control panel 105 using the communication links 112. To reduce the communication size between the mobile device 115 and the control panel 105, messages between the mobile device 115 and the control panel 105 may be coded. The control panel 105 may generate one or more code indices and send one of the code indices to the mobile device 115 when the mobile device 115 is connected to the control panel via one or more communication links 112. The transmitted code index may be specific to the user of the mobile device FIG. 2 shows a block diagram 200 of an apparatus 205 for use in electronic communication, in accordance with various aspects of this disclosure. The apparatus 205 may be an example of one or more aspects of a control panel 105 and/or a device 115, such as a mobile device, described with reference to FIG. 1. In some embodiments, the control panel 105 and mobile device 115 may communicate. The apparatus 205 may include a receiver module 210, a communication module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive one or more coded communications from a mobile device and/or control panel. Information may be passed on to the communication module 215, and to other components of the apparatus 205.

The communication module 215 may code or decode one or more communications. For example, the automation system may comprise catalog of words, phrases, or commands. Each entry in the catalog may be assigned a codifier or unique identifier creating a code index. Coding a communication may comprise replacing a word, phrase, or command with the codifier to reduce a size of the communication. The codifier or unique identifier may comprise a number, a letter, a symbol, or some combination thereof. If the automation system is utilizing multiple codes, the communication module 215 may insert an identifying prefix to accurately identify the specific code index used.

In some embodiments, the communication module 215 may comprise a transmission module 225 and a reception module 230. The transmission module 225 may generate and code a message to deliver to the mobile device and/or a control panel. The code may comprise a specific code from an index of codes generated by the apparatus 205 and/or the automation system. The code index may be locally stored on a mobile device and/or control panel. The control panel may comprise multiple sets of code indices if the automation system utilizes user-specific coding. The transmission module 225 may thoroughly code the communication prior to sending to the mobile device and/or control panel. In some embodiments, the message may be coded and then encrypted for security purposes. The reception module 230 may receive a coded communication from the mobile device and/or control panel and may decode the message prior to any further action by the apparatus 205. If the communication is encrypted, the reception module 230 may decrypt the message prior to decoding it.

The transmitter module 220 may transmit the one or more signals received from other components of the apparatus 205. The transmitter module 220 may transmit one or more coded messages to the mobile device and/or control panel. In some examples, the transmitter module 220 may be collocated with the receiver module 210 in a transceiver module.

Figure 3:
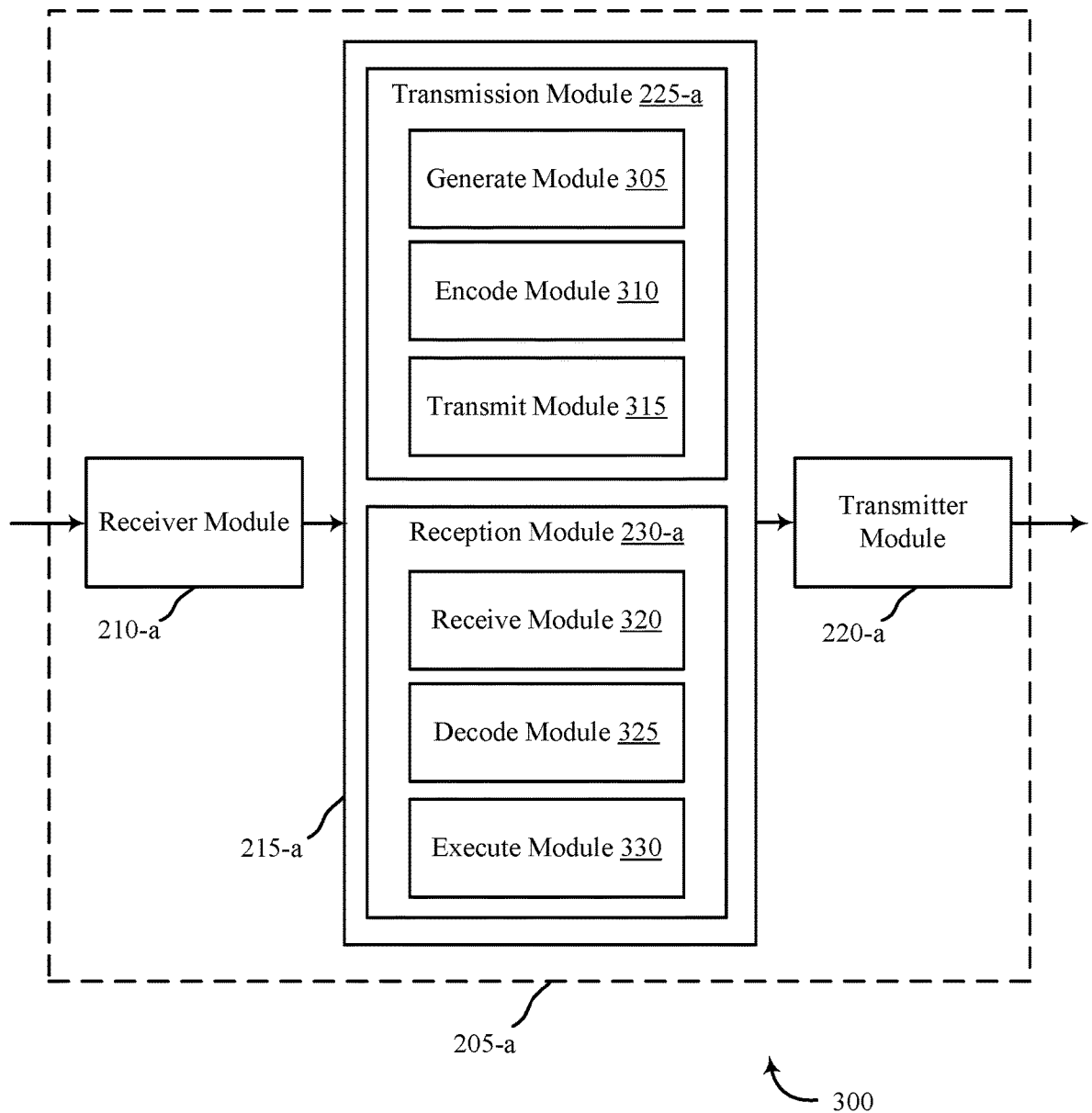
FIG. 3 shows a block diagram of a device relating to a security and/or an automation system, in accordance with various aspects of this disclosure.

FIG. 3 shows a block diagram 300 of an apparatus 205-*a* for use in wireless communication, in accordance with various examples. The apparatus 205-*a* may be an example of one or more aspects of a control panel 105 and/or device 115, such as a mobile device 115, described with reference to FIG. 1. In some embodiments, the mobile device 115 and the control panel 105 may communicate. The apparatus 205-*a* may also be an example of an apparatus 205 described with reference to FIG. 2. The apparatus 205-*a* may include a receiver module 210-*a*, a communication module 215-*a*, a transmission module 225-*a*, a reception module 230-*a* and/or a transmitter module 220-*a*, which may be examples of the corresponding modules of apparatus 205. The apparatus 205-*a* may also include a processor. Each of these components may be in communication with each other. The transmission module 225-*a* may include a generate module 305, an encode module 310, and a transmit module 315. The reception module 230-*a* may comprise a receive module 320, a decode module 325, and an execute module 330. The receiver module 210-*a* and the transmitter module 220-*a* may perform the functions of the receiver module 210 and the transmitter module 220, of FIG. 2, respectively.

The components of the apparatus 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The generate module 305 may generate one or more communications to a mobile device and/or control panel. The communications may comprise an alert, an informative message, a request for action, a command, a response to a request, or the like. The communications may be generic or may be user specific. Additionally, the communications may be selected from a series of predetermined commands or responses. In some embodiments, the communications may greet the user by name and include one or more personalized aspects unique to the user. In some instances, the communications may be generated by other modules but may need to be reworded or rephrased for better coding. The generate module 305 may run an algorithm to rework the message for more appropriate mobile communications. In some instances, the generate module 305 may interpret a user's input and transcribe the message for better coding. If the message is more personalized, for example, a note to another user, the generate module 305 may correct any grammar and reduce a size of the message by removing superfluous wording.

The encode module 310 may take the communication produced by the generate module 305 and transcribe it into a coded communication. The encode module 310 may use a generate coding scheme to code the communications. In some embodiments, the encode module 310 may use a coding index specific to the automation system provider, the automation system, the control panel, the user or the like. If the apparatus 205-*a* is a mobile device (e.g. mobile device 115), the encode module 310 may use a locally stored code index. The code index may be uploaded to the mobile device when the mobile device is connected to a Wi-Fi or other connection that does not consume data across a wireless broadband service. If the apparatus 205-*a* is a control panel (e.g. control panel 105), the control panel may generate the code or it may receive the index from a server associated with the automation system. Coding the communication may reduce a size of the communication. The encode module 310 may code the communication based on one or more size parameters. The size parameters may specify the desired size of a message to transmit to the user. The size of the message may be based on a location of the user. For example, the encode module 310 may determine if a device, such as a mobile device, is connected to one or more Wi-Fi circuits which may allow the encode module 310 to transmit an uncoded message. In other embodiments, if the mobile device is connected to a wireless broadband service, the encode module 310 may attempt to reach a predetermined size for its message.

Once the communication is coded, the transmit module 315 may execute one or more actions. For example, the transmit module 315 may send a communication to a mobile device and/or control panel. In some embodiments, if the communication exceeds a size parameter for a communication, the transmit module 315 may alert the user and/or automation system. The user and/or automation system may then have the option of sending the communication regardless of size, or, if necessary, rewording, or attempting to further code the communication to reduce its size. In some embodiments, the transmit module 315 may transfer the communication to the transmitter module 220-*a* to effectuate transfer of the communication.

The receive module 320 may receive one or more communications from the mobile device. The receive module 320 may identify an origin of the communication and determine if the communication is coded. For example, the receive module 320 may determine if the message is in a readable format and/or an executable format. If the message is not in a readable format and/or an executable format, the receive module may direct the message to the decode module 325.

The decode module 325 may determine which coding system was used to code the communication. In some instances, the automation system may use the same coding system for every communication sent between a mobile device and a control panel. In another embodiment, the communication may be embedded with a code identifier to correctly identify the code index utilized. The code identifier may be as simple as the beginning characters of the coded message. The prefix to the actual communication may identify the correct code index. Once the decode module 325 has correctly identified the correct coding index, the decode module 325 may decode the message and transcribe it to a readable medium. In another embodiment, the decode module 325 may decode the message using a locally stored code index and transcribe it to a readable medium. If the apparatus 205-*a* is a mobile device, the mobile device may only have one code index locally stored. Once the message is in a readable medium, the decode module 325 may transfer the communication to the execute module 330.

The execute module 330 may read and interpret the communication. The execute module 330 may then determine where to transfer the communication. For example, if the apparatus 205-*a* is a control panel and the communication is a command, the execute module 330 may push the communication to a command module. If the communication is a message for a user, the execute module 330 may push the communication to a message module, and so on. If the apparatus 205-*a* is a mobile device, the execute module 330 may deliver the message to the user. Displaying the message may comprise delivering a ping message, an SMS message, a message within an application, and the like.

Figure 4:
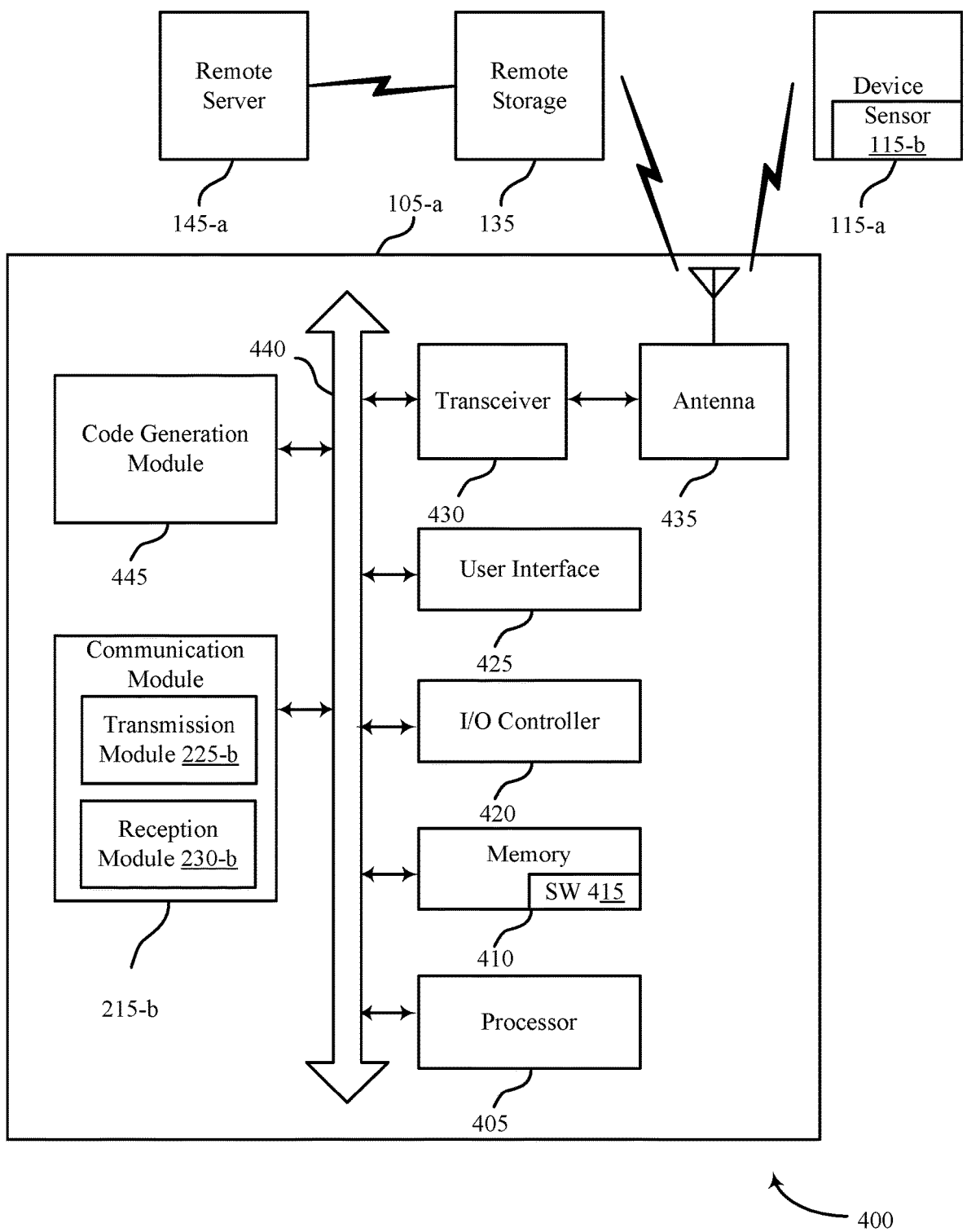
FIG. 4 shows a block diagram of an apparatus relating to a security and/or an automation system, in accordance with various aspects of this disclosure.

FIG. 4 shows a system 400 for use in reducing the size of a communications in automation systems, in accordance with various examples. The system 400 may include a control panel 105-*a*, which may be an example of the control panels 105 of FIG. 1. Control panel 105-*a* may also be an example of one or more aspects of the apparatus 205 and/or 205-*a* of FIGS. 2 and 3.

The control panel 105-*a* may include a code generation module 445. The code generation module 445 may generate one or more code indexes to code one or more communications in the automation system. The code generation module 445 may use a base code index provided by a remote server 145-*a*. The base code index may include a list of generic automation system messages and commands and a code for each. The code generation module 445 may use the base code index and personalize the code index for the specific automation system and, in some embodiments, for a specific user. For example, the code generation module 445 may develop one or more codes to efficiently communicate unique aspects of the automation system. This may include unique sensors, unique names, unique commands, and the like. The code module may comprise a catalog of words, phrases, or commands. The code generation module 445 may take each entry in the catalog and assign it a codifier or unique identifier creating a code index.

The control panel 105-*a* may include transmission module 225-*b*, which may be an example of transmission module 225 described with reference to FIGS. 2 and 3. The control panel 105-*a* may also include reception module 230-*b*, which may be an example of reception module 230 described with reference to FIGS. 2 and 3. In some embodiments, the terms a control panel and a control device are used synonymously.

The control panel 105-*a* may also include components for bi-directional voice and data communications including components for transmitting communications and components for receiving communications. For example, the control panel 105-*a* may communicate bi-directionally with one or more of device 115-*a*, one or more sensors 115-*b*, remote storage 135-*b*, and/or remote server 145-*a*, which may be an example of the remote server of FIG. 1. This bi-directional communication may be direct (e.g., control panel 105-*a* communicating directly with remote storage 135) or indirect (e.g., control panel 105-*a* communicating indirectly with remote server 145-*a* through remote storage 135).

The transmission module 225-*b* may create and code one or more communications to transmit to the device 115-*a* based at least in part on size parameters as described above with reference to FIGS. 2 and/or 3. For example, the transmission module 225-*b* may generate and code one or more communications to send to the device 115-*a*. The transmission module 225-*b* may use one or more code indexes to code the messages. The code index may be a code index generated by the code generation module 445.

The reception module 230-*b* may receive and decode one or more messages received from a device 115-*a* as described above with reference to FIGS. 2 and/or 3. For example, the reception module 230-*b* may recognize when an incoming communication is coded and may decode the message. The reception module 230-*b* may use a code index generated by the code generation module 445. The reception module 230-*b* may decode the communication to a readable and/or actionable item.

The control panel 105-*a* may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-*a*, remote storage 135, and/or remote server 145-*a*. The transceiver module 430 may include a modem to modulate the packets and provide the modulated packets to the one or more antennas 435 for transmission, and to demodulate packets received from the one or more antenna 435. While a control panel or a control device (e.g., 105-*a*) may include a single antenna 435, the control panel or the control device may also have multiple antennas 435 capable of concurrently transmitting or receiving multiple wired and/or wireless transmissions. In some embodiments, one element of control panel 105-*a* (e.g., one or more antennas 435, transceiver module 430, etc.) may provide a direct connection to a remote server 145-*a* via a direct network link to the Internet via a POP (point of presence). In some embodiments, one element of control panel 105-*a* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 115-*b* (e.g., motion, proximity sensor, smoke, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of control panel 105-*a* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., code or decode one or more communications between a mobile device and a control panel, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the processor module 405 may include, among other things, an intelligent hardware device (e.g., a central processing unit (CPU), a microcontroller, and/or an ASIC, etc.). The memory 410 can contain, among other things, the Basic Input-Output system (BIOS) which may control basic hardware and/or software operation such as the interaction with peripheral components or devices. For example, the transmission module 225-b and/or the reception module 230-b to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the devices 115-a may include a single antenna 435, the devices 115-a may have multiple antennas 435 capable of concurrently transmitting and/or receiving multiple wireless transmissions.

Figure 5:
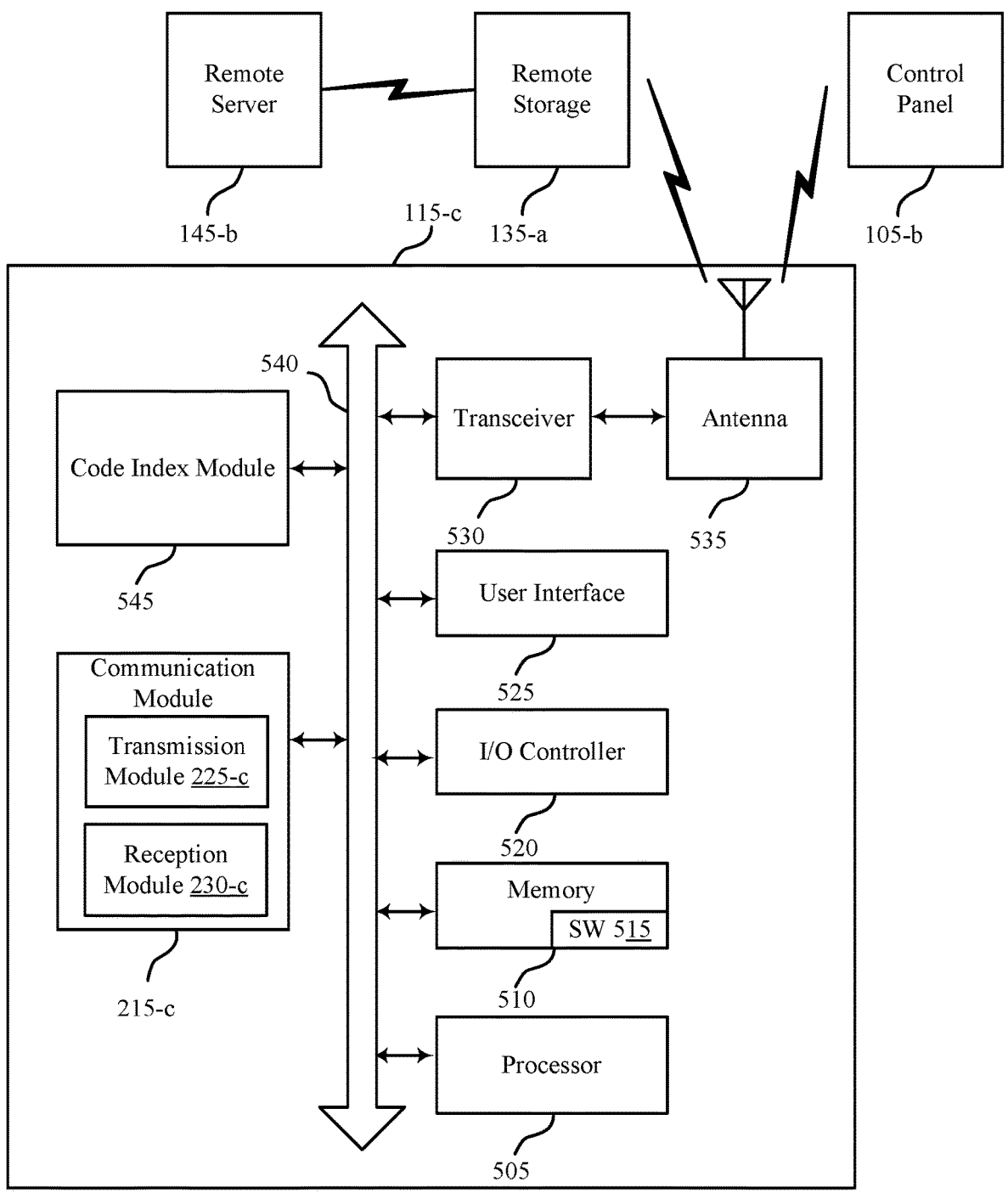
FIG. 5 shows a block diagram of an apparatus relating to a security and/or an automation system, in accordance with various aspects of this disclosure

FIG. 5 shows a system 500 for use in reducing the size of a communications in automation systems, in accordance with various examples. The system 500 may include a mobile device 115-c, which may be an example of the device 115 and/or 115-a of FIGS. 1 and/or 4. The mobile device 115-c may also be an example of one or more aspects of the apparatus 205 and/or 205-a of FIGS. 2 and 3.

The mobile device 115-c may include a code index module 545. The code index module 545 may store a code index for coding and decoding communications with the control panel 105-b. The code index module 545 may update the code index when the mobile device 115-c is connected to a Wi-Fi network, plugged into a device associated with the automation system, and the like. The code index module 545 may also review the code index to ensure there are no discrepancies in the current code index locally stored on the mobile device 115-c (e.g. stored in the memory 510) and the code index stored at the control panel 105-b.

The mobile device 115-c may include transmission module 225-c, which may be an example of transmission module 225 and/or 225-a described with reference to FIGS. 2 and/or 3. The mobile device 115-c may also include reception module 230-c, which may be an example of reception module 230 and/or 230-a described with reference to FIGS. 2 and/or 3. In some embodiments, the terms a mobile device and a device are used synonymously.

The mobile device 115-c may also include components for bi-directional voice and data communications including components for transmitting communications and components for receiving communications. For example, the mobile device 115-c may communicate bi-directionally with one or more of control panel 105-b, remote storage 135-a, which may be an example of the remote storage 135 of FIG. 4, and/or remote server 145-b, which may be an example of the remote server 145 of FIG. 1. This bi-directional communication may be direct (e.g., mobile device 115-c communicating directly with remote storage 135-a) or indirect (e.g., mobile device 115-c communicating indirectly with remote server 145-a through remote storage 135-a).

The transmission module 225-c may create and code one or more communications to transmit to the control panel 105-b. For example, the transmission module 225-c may generate and code one or more communications to send to the control panel 105-b. The transmission module 225-c may use a locally stored code index to code the communications. The code index may be a stored and updated by the code index module 545.

The reception module 230-c may receive and decode one or more messages received from the control panel 105-b as described above with reference to FIGS. 2 and/or 3. For example, the reception module 230-c may receive and decode an incoming communication. The reception module 230-c may use the locally stored code index maintained by the code index module 545. The reception module 230-c may decode the communication and display it to a user.

The mobile device 115-c may also include a processor module 505, and memory 510 (including software/firmware code (SW) 515), an input/output controller module 520, a user interface module 525, a transceiver module 530, and one or more antennas 535 each of which may communicate—directly or indirectly—with one another (e.g., via one or more buses 540). The transceiver module 530 may communicate bi-directionally—via the one or more antennas 535, wired links, and/or wireless links—with one or more networks or remote devices as described above. For example, the transceiver module 530 may communicate bi-directionally with one or more of control panel 105-b, remote storage 135-a, and/or remote server 145-b. The transceiver module 530 may include a modem to modulate the packets and provide the modulated packets to the one or more antennas 535 for transmission, and to demodulate packets received from the one or more antenna 535. While a mobile device (e.g., 115-c) may include a single antenna 535, the mobile device or device may also have multiple antennas 535 capable of concurrently transmitting or receiving multiple wired and/or wireless transmissions. In some embodiments, one element of mobile device 115-*c* (e.g., one or more antennas 535, transceiver module 530, etc.) may provide a direct connection to a remote server 145-*b* via a direct network link to the Internet via a POP (point of presence). In some embodiments, one element of mobile device 115-*c* (e.g., one or more antennas 535, transceiver module 530, etc.) may provide a connection using wireless techniques, including digital cellular telephone connection, Cellular Digital Packet Data (CDPD) connection, digital satellite data connection, and/or another connection.

The signals associated with system 500 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 535 and/or transceiver module 530 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 535 may receive signals or information specific and/or exclusive to itself. In other embodiments, each antenna 535 may receive signals or information not specific or exclusive to itself.

In some embodiments, the control panel 105-*b* may connect to some element of system 500 via a network using one or more wired and/or wireless connections.

In some embodiments, the user interface module 525 may include an audio device, such as an external speaker system, an external display device such as a display screen, and/or an input device (e.g., remote control device interfaced with the user interface module 525 directly and/or through I/O controller module 520).

One or more buses 540 may allow data communication between one or more elements of the device 115-*c* (e.g., processor module 505, memory 510, I/O controller module 520, user interface module 525, etc.).

The memory 510 may include random access memory (RAM), read only memory (ROM), flash RAM, and/or other types. The memory 510 may store computer-readable, computer-executable software/firmware code 515 including instructions that, when executed, cause the processor module 505 to perform various functions described in this disclosure (e.g., code or decode one or more communications between a mobile device and a control panel, etc.). Alternatively, the software/firmware code 515 may not be directly executable by the processor module 505 but may cause a computer (e.g., when compiled and executed) to perform functions described herein. Alternatively, the computer-readable, computer-executable software/firmware code 515 may not be directly executable by the processor module 505 but may be configured to cause a computer (e.g., when compiled and executed) to perform functions described herein. The processor module 505 may include an intelligent hardware device, e.g., a central processing unit (CPU), a microcontroller, an application-specific integrated circuit (ASIC), etc.

In some embodiments, the processor module 505 may include, among other things, an intelligent hardware device (e.g., a central processing unit (CPU), a microcontroller, and/or an ASIC, etc.). The memory 510 can contain, among other things, the Basic Input-Output system (BIOS) which may control basic hardware and/or software operation such as the interaction with peripheral components or devices. For example, the transmission module 225-*c* and/or the reception module 230-*c* to implement the present systems and methods may be stored within the system memory 510. Applications resident with system 500 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 530, one or more antennas 535, etc.).

Many other devices and/or subsystems may be connected to one or may be included as one or more elements of system 500 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 5 need not be present to practice the present systems and methods. The devices and subsystems can be interconnected in different ways from that shown in FIG. 5. In some embodiments, an aspect of some operation of a system, such as that shown in FIG. 5, may be readily known in the art and are not discussed in detail in this application. Code to implement the present disclosure can be stored in a non-transitory computer-readable medium such as one or more of system memory 510 or other memory. The operating system provided on I/O controller module 520 may be iOS®, ANDROID®, MS-DOS®, MS-WINDOWS®, OS/2®, UNIX®, LINUX®, or another known operating system.

The transceiver module 530 may include a modem configured to modulate the packets and provide the modulated packets to the antennas 535 for transmission and/or to demodulate packets received from the antennas 535. While the mobile device 115-*c* may include a single antenna 535, the mobile device 115-*c* may have multiple antennas 535 capable of concurrently transmitting and/or receiving multiple wireless transmissions.

Figure 6:
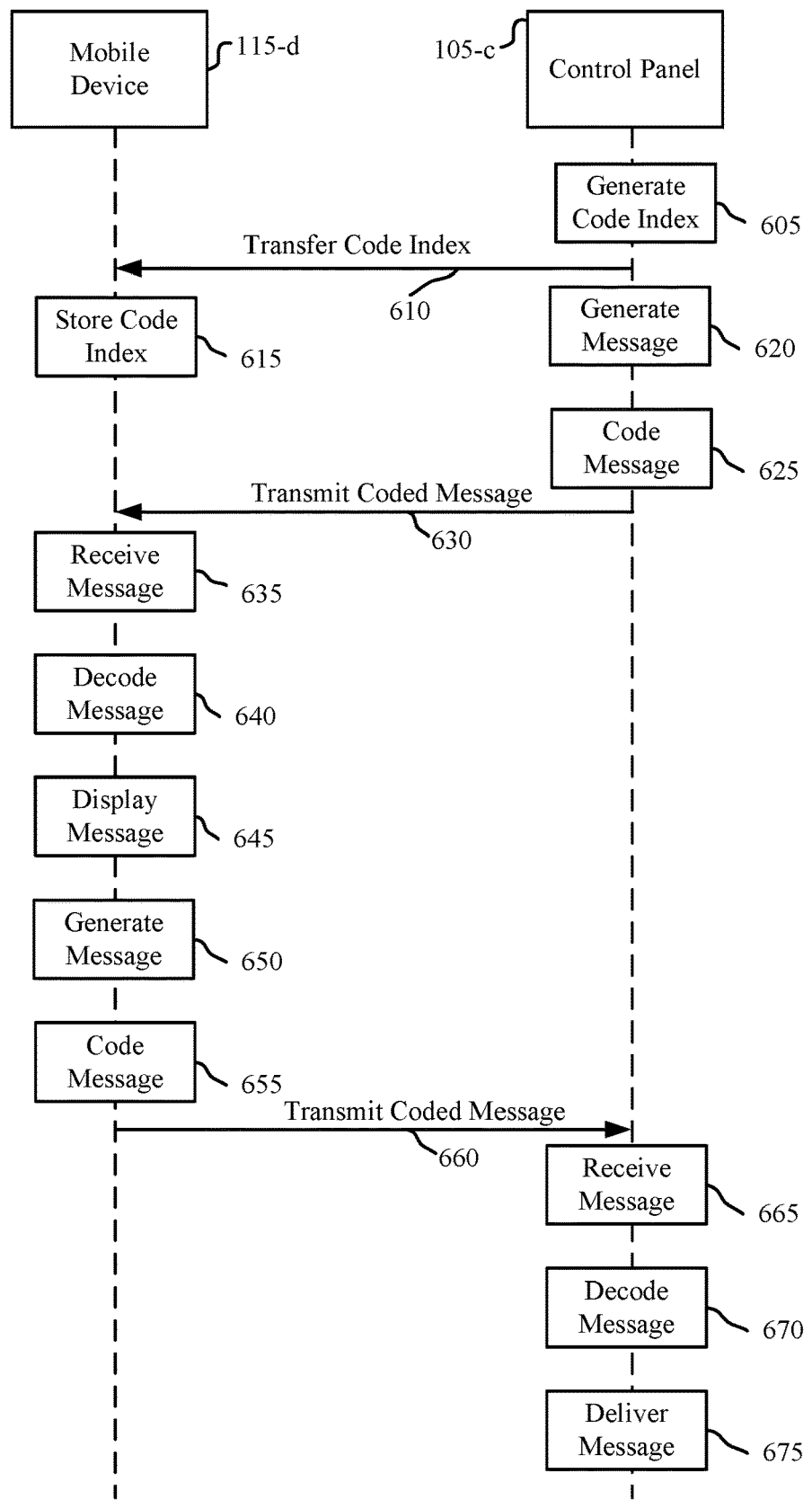
FIG. 6 shows a swim diagram of an apparatus relating to a security and/or an automation system, in accordance with various aspects of this disclosure.

FIG. 6 shows a swim diagram 600 illustrating communications in security systems for a control panel and a mobile device, in accordance with various examples. The diagram 600 may illustrate one or more mobile devices 115-*d*, which may be an example of the device 115 of FIGS. 1, 4 and 5. The diagram 600 may also illustrate a control panel 105-*c* which may an example of control panel 105 of FIGS. 1, 4, and/or 5. The mobile device 115-*d* and/or the control panel 105-*c* may additionally be an example of one or more aspects of apparatus 205 and/or 205-*a* described with respect to FIG. 2 or 3.

The control panel 105-*c* may generate one or more code indexes 605. The code indexes may be based from a generic code index and personalized for the use of an automation system or even one or more individual users of the automation system. For example, the code index may develop one or more codes for specific nomenclature and abilities of the automation system. The code index may additionally comprise one or more codes for the names of users of the automation system.

The control panel 105-*c* may then transfer the code index 610 to the mobile device 115-*d*. The control panel 105-*c* may only transfer and/or update the code index when the mobile device 115-*d* is connected to a Wi-Fi connection. The code index may be a sizable file format and using a Wi-Fi connection may increase the speed of the transfer and prevent the use of the user's allotment on a wireless broadband system per a cellular data plan. The mobile device 115-*d* may store the code index 615 locally on a memory (e.g. memory 510).

The control panel 105-*c* may then generate a message 620 (e.g. a communication) to send to the mobile device 115-*d*. The message may comprise a request from the user, an alert, a status update, or the like. The control panel 105-*c* may then code the message 625. Coding the message 625 may comprise using one or more code indexes generated by the control panel 105-*c* to reduce a size of the message. Once the message is coded, the coded message may be transmitted 630 to the mobile device 115-*d*.

The mobile device 115-*d* may receive the message 635 and decode the message 640. For example, the mobile device 115-*d* may use the locally stored copy of the code index to translate the message to its original state. The locally stored code index may be the only code index the mobile device 115-*d* has access to. Once the message is sufficiently decoded, the message may be displayed to the user 645.

The user may respond to the message. The mobile device 115-*d* may generate the message 650. The message may comprise receiving inputs from the user and transferring the inputs into a legible message. In other embodiments, the user may send a command to the automation system which may generate a message 650. The mobile device 115-*d* may code the message 655. The mobile device 115-*d* may utilize the same locally stored code index to code the message 655. Once the message is coded, the mobile device 115-*d* may transfer the coded message 660 to the control panel 105-*c*.

The control panel 105-*c* may receive the message 665 and decode the message 670. The control panel 105-*c* may have the same code index locally stored at the control panel 105-*c*. The control panel 105-*c* may assess the incoming message for clarity to ensure there are no coding discrepancies between the two coded messages. If the decoded message is readable and/or actionable, the control panel 105-*c* may deliver the message 675. Delivering the message 675 may comprise transferring the message to one or more modules proximate the control panel 105-*c* for an executable action. The executable action may comprise delivering the message to another user associated with the automation system, executing a command, responding to a status request, or the like.

Figure 7:
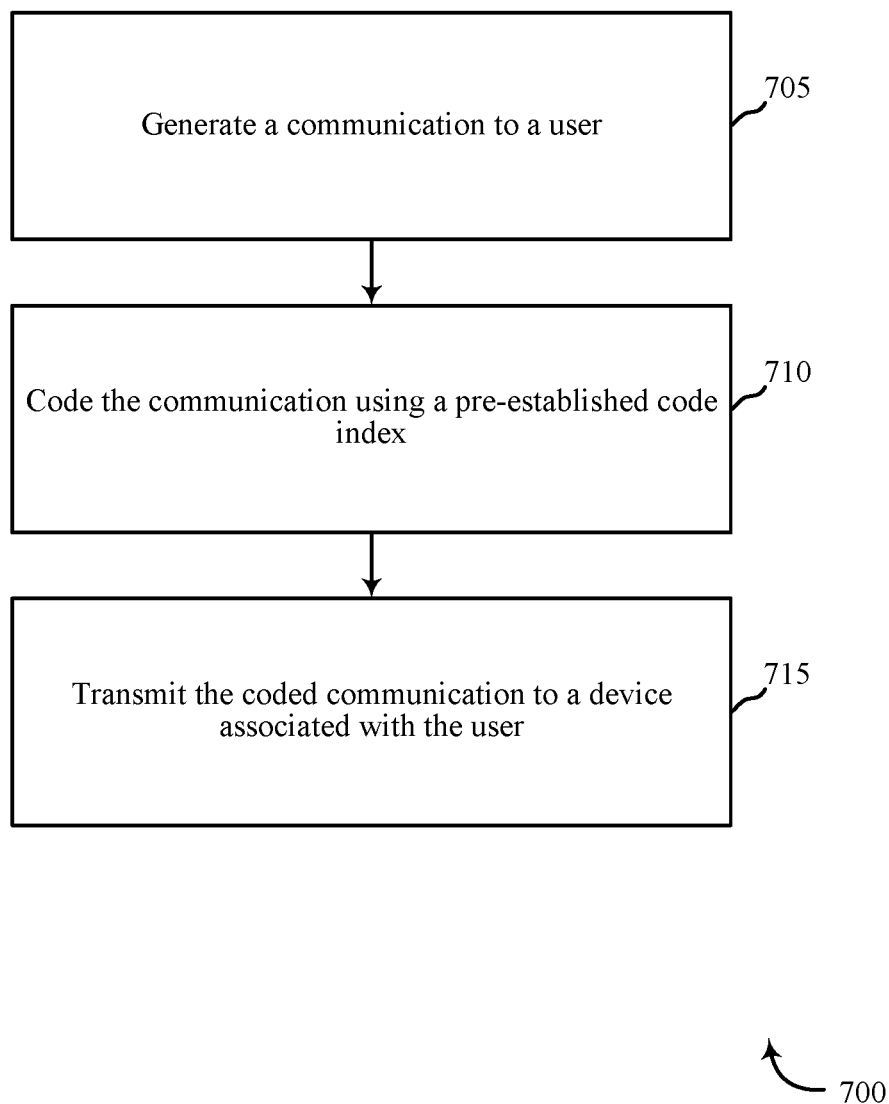
FIG. 7 is a flow chart illustrating an example of a method relating to a security and/or an automation system, in accordance with various aspects of this disclosure.

FIG. 7 is a flow chart illustrating an example of a method 700 for reducing a size of communications between a control panel and a device, in accordance with various aspects of the present disclosure. For clarity, the method 700 is described below with reference to aspects of one or more of the communication module 215 described with reference to FIG. 2, 3, or 4, and/or aspects of one or more of the code generation module 445 described with reference to FIG. 4. In some examples, a control panel may execute one or more sets of codes to control the functional elements of the control panel to perform the functions described below. Additionally or alternatively, the control panel may perform one or more of the functions described below using special-purpose hardware.

At block 705, the method 700 may include generating a communication to a user. The communication may comprise an alert, an informative message, a request for action, or the like. The communication may be generic or may be user specific. For example, the communication may greet the user by name and include one or more personalized aspects unique to the user. In some instances, the communications may be reworded or rephrased for increased coding efficiency.

The operation(s) at block 705 may be performed using the generate module 305 described with reference to FIG. 3.

At block 710, the method 700 may include coding the communication using a pre-established code index. In some embodiments, the communication may be coded using a generate coding scheme. In other embodiments, a code index specific to the automation system provider, the automation system, the control panel, the user, or the like may be used. Coding the communication may reduce a size of the communication. The communication may be coded based on one or more size parameters. The size parameters may specify the desired size of a message to transmit to the user. The size of the message may be based at least in part on a location of the user. For example, if the mobile device is connected to one or more Wi-Fi networks, an uncoded message may be transmitted. In other embodiments, if the mobile device is connected to a wireless broadband service, the communication may be coded to reduce its size.

The operation(s) at block 710 may be performed using the encode module 310 described with reference to FIG. 3.

At block 715, the method 700 may include transmitting the coded communication to a device associated with the user. For example, the control panel may push the communication to the user using either a wireless broadband service or a Wi-Fi connection. The communication may be displayed as an SMS message, or may be directed to an application locally stored on the device.

The operation(s) at block 715 may be performed using the transmit module 315 described with reference to FIG. 3.

Thus, the method 700 may provide for reducing a size of communications between a control panel and a device relating to automation/security systems. It should be noted that the method 700 is just one implementation and that the operations of the method 700 may be rearranged or otherwise modified such that other implementations are possible.

Figure 8:
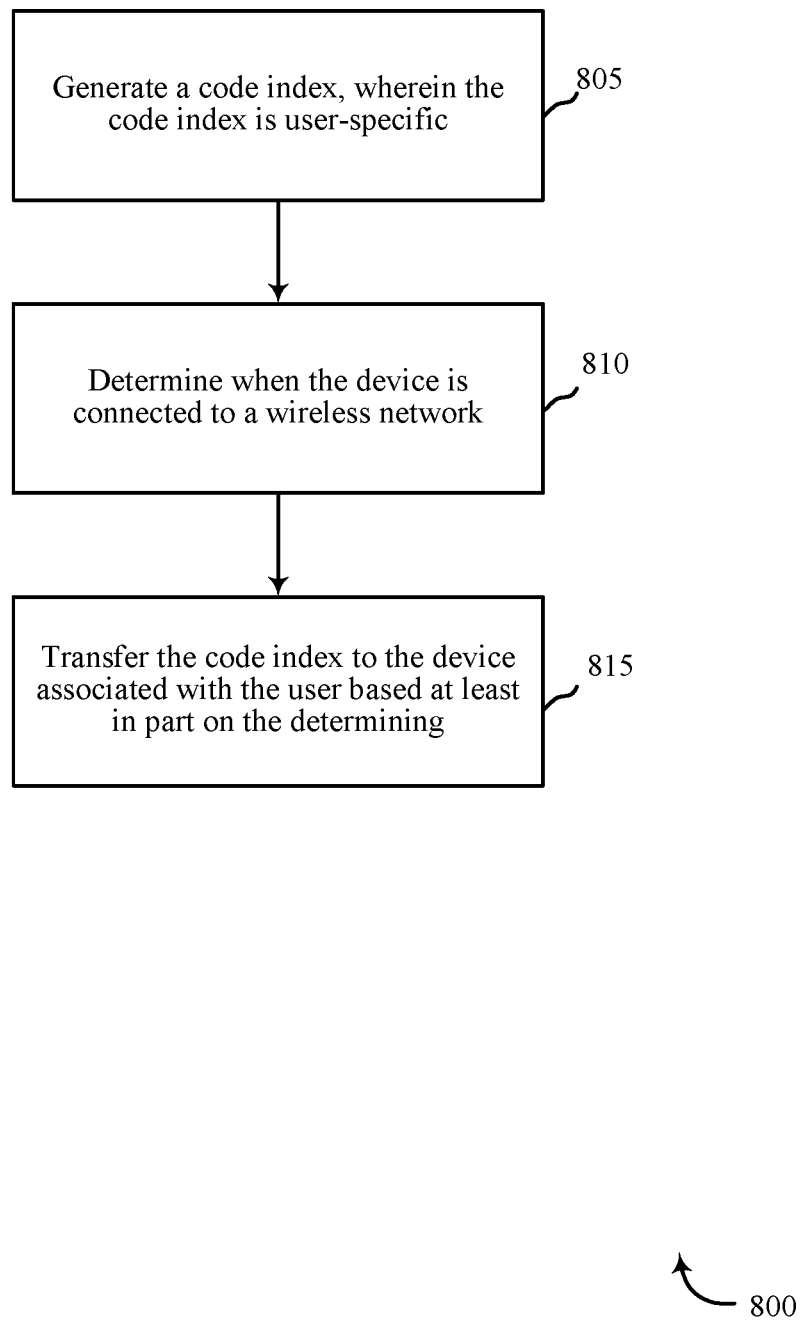
FIG. 8 is a flow chart illustrating an example of a method relating to a security and/or an automation system, in accordance with various aspects of this disclosure.

FIG. 8 is a flow chart illustrating an example of a method 800 for reducing a size of communications between a control panel and a device, in accordance with various aspects of the present disclosure. For clarity, the method 800 is described below with reference to aspects of one or more of the communication module 215 described with reference to FIG. 2, 3, or 4, and/or aspects of one or more of the code generation module 445 described with reference to FIG. 4. In some examples, a control panel may execute one or more sets of codes to control the functional elements of the control panel to perform the functions described below. Additionally or alternatively, the control panel may perform one or more of the functions described below using special-purpose hardware.

At block 805, the method 800 may include generating a code index, wherein the code index is user-specific. The user-specific index may be based at least in part on a base code index which may include a list of generic automation system messages, commands, and phrases with a coordinating abbreviated code for each. One or more codes may be developed specific to the user to efficiently communicate unique aspects of the automation system. This may include unique sensors, unique names, unique commands, and the like.

At block 810, the method 800 may include determining when the device is connected to a wireless network. For example, whenever the device connects to a landline internet connection, the device may ping the control panel. In other embodiments, the control panel itself may recognize when the device connects to its local Wi-Fi network.

At block 815, the method 800 may include transferring the code index to the device associated with the user based at least in part on the determining. The code index may be a sizable file. If the device was connected to a wireless broadband service using a data plan, the file may consume a large portion of the data allotment for the user. Additionally, the file may take an undesirable length of time to download and, in some instances, may slow other functions of the device. Using a Wi-Fi connection to download and/or update the code index may result in no data-usage for the data plan and a faster, more efficient download time. Reducing the data usage for the data plan may save the user money. For example, some data plans may charge the consumer based on data consumption. In another embodiment, the user may have a data allotment per their plan and the user may not be able to access their data plan if the allotment is satisfied or may pay an increased rate for any data transfer in excess of the allotment.

The operation(s) at blocks 805-815 may be performed using the code generation module 445 described with reference to FIG. 4.

Thus, the method 800 may provide for reducing a size of communications between a control panel and a device relating to automation/security systems. It should be noted that the method 800 is just one implementation and that the operations of the method 800 may be rearranged or otherwise modified such that other implementations are possible.

Figure 9:
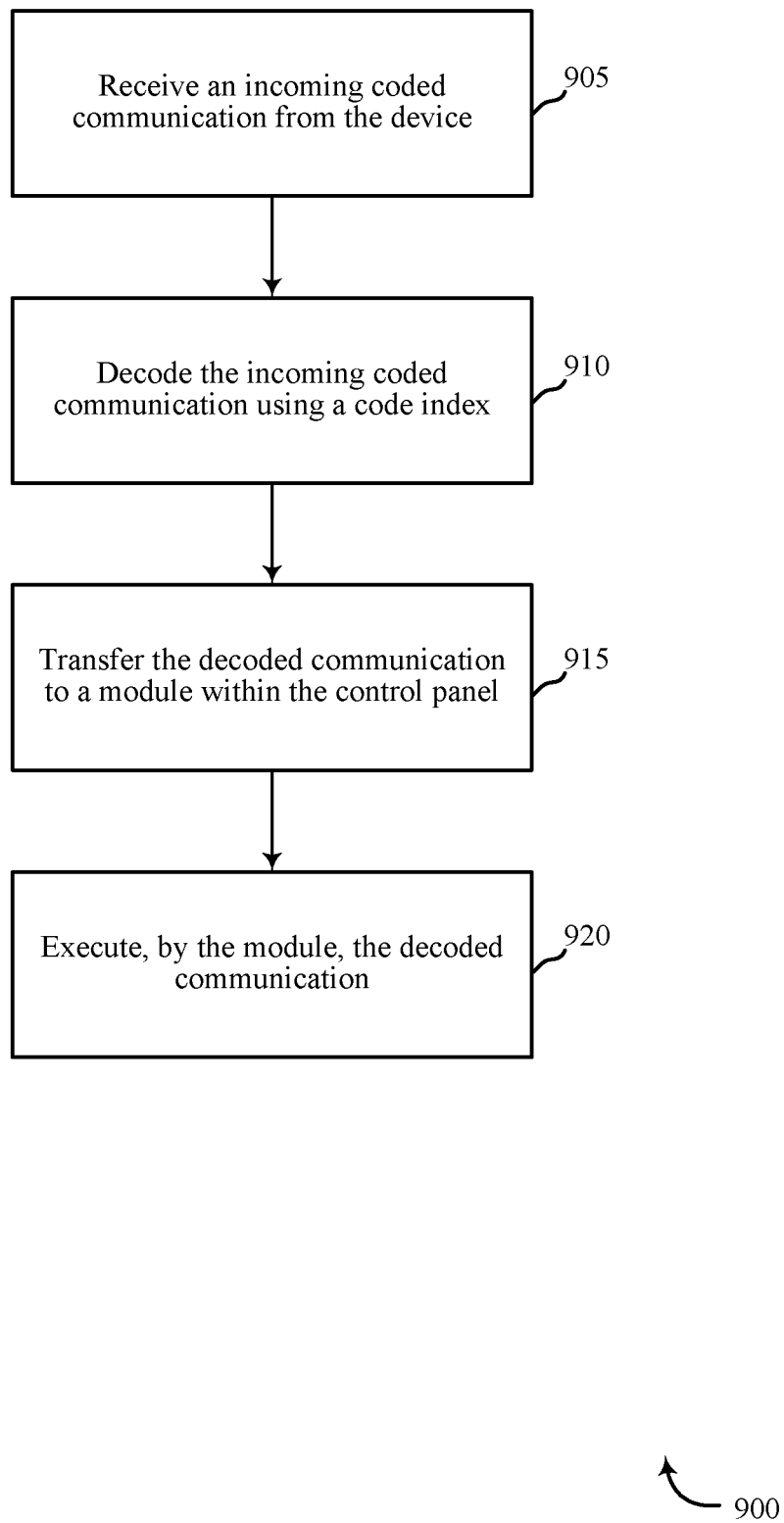
FIG. 9 is a flow chart illustrating an example of a method relating to a security and/or an automation system, in accordance with various aspects of this disclosure.

FIG. 9 is a flow chart illustrating an example of a method 900 for reducing a size of communications between a control panel and a device, in accordance with various aspects of the present disclosure. For clarity, the method 900 is described below with reference to aspects of one or more of the communication module 215 described with reference to FIG. 2, 3, or 4, and/or aspects of one or more of the code generation module 445 described with reference to FIG. 4. In some examples, a control panel may execute one or more sets of codes to control the functional elements of the control panel to perform the functions described below. Additionally or alternatively, the control panel may perform one or more of the functions described below using special-purpose hardware.

At block 905, the method 900 may include receiving an incoming coded communication from the device. The method 900 may include determining an origin of the communication and determining if the message is coded. The origin of the message may comprise a user, a device, a service provider, or the like. The method 900 may determine the communication is not in an executable or readable format.

The operation(s) at block 905 may be performed using the receive module 320 described with reference to FIG. 3.

At block 910, the method 900 may include decoding the incoming coded communication using a code index. The method 900 may determine which coding system was used to code the communication. In some instances, the automation system may use the same coding system for every communication sent between a mobile device. In another embodiment, the communication may be embedded with a code identifier to correctly identify the code index utilized. The code identifier may be as simple as the beginning characters of the coded message. The prefix to the actual communication may identify the correct code index. Once the correct coding index is identified, the communication may be decoded and transcribed to a readable medium. Once the message is in a readable medium, the decode module 325 may transfer the communication to the execute module 330.

The operation(s) at block 910 may be performed using the decode module 325 described with reference to FIG. 3.

At block 915, the method 900 may include transferring the decoded communication to a module within the control panel. For example, if the communication is a command, method 900 may push the communication to a command module. If the communication is a message for a user, the execute module 330 may push the communication to a message module, and so on. At block 920, the method 900 may include executing, by the module, the decoded communication.

The operation(s) at block 915 may be performed using the execute module 330 described with reference to FIG. 3. The operation(s) at block 920 may be performed using the others modules proximate the control panel (e.g. control panel 105).

Thus, the method 900 may provide for reducing a size of communications between a control panel and a device relating to automation/security systems. It should be noted that the method 900 is just one implementation and that the operations of the method 900 may be rearranged or otherwise modified such that other implementations are possible.

Figure 10:
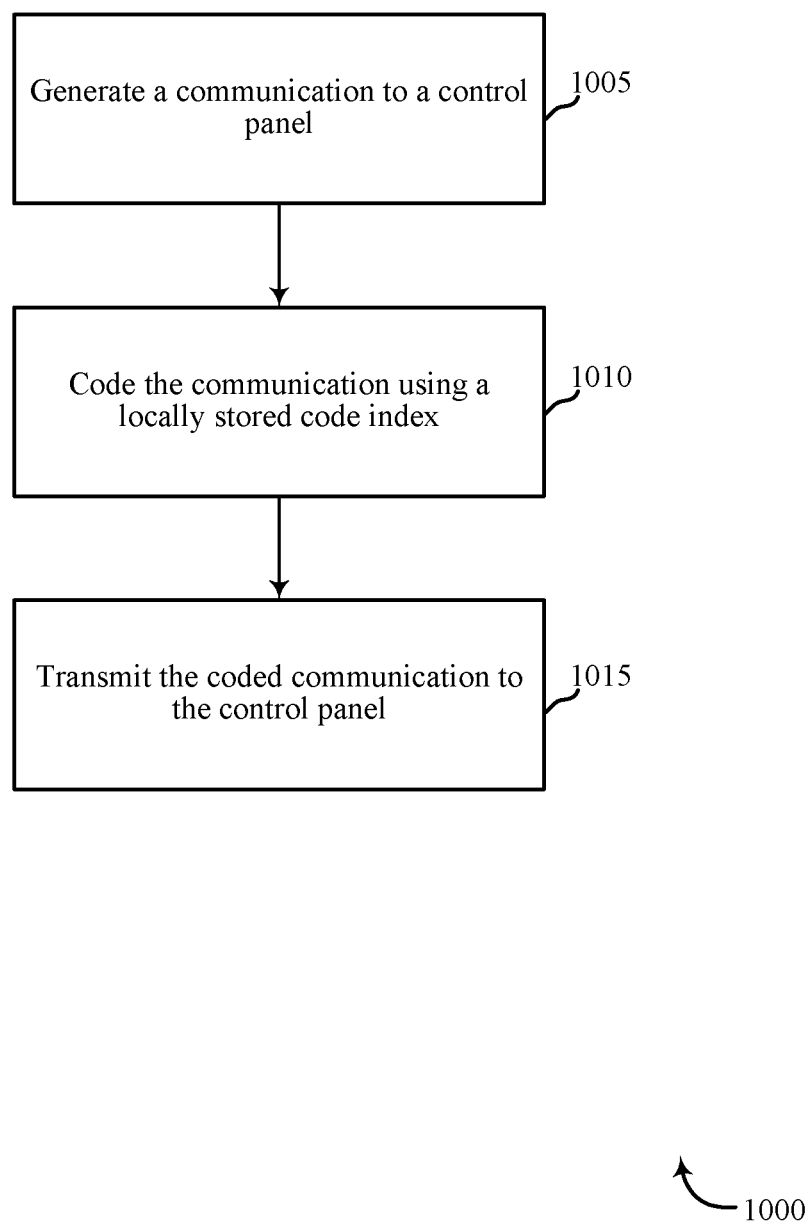
FIG. 10 is a flow chart illustrating an example of a method relating to a security and/or an automation system, in accordance with various aspects of this disclosure.

FIG. 10 is a flow chart illustrating an example of a method 1000 for reducing a size of communications between a control panel and a device, in accordance with various aspects of the present disclosure. For clarity, the method 1000 is described below with reference to aspects of one or more of the communication module 215 described with reference to FIG. 2, 3, or 5, and/or aspects of one or more of the code index module 545 described with reference to FIG. 5. In some examples, a mobile device may execute one or more sets of codes to control the functional elements of the mobile device to perform the functions described below. Additionally or alternatively, the mobile device may perform one or more of the functions described below using special-purpose hardware.

At block 1005, the method 1000 may include generating a communication to a control panel. The communication may comprise a command, a response to a request, or the like. The communication may be selected from a series of predetermined commands or responses. In some instances, the method 1000 may transcribe the user's input into a better format for coding. For example, the method 1000 may replace one or more phrases with phrases of the same meaning. The alternate phrases may be easier to code, and therefore, to reduce a size of the communication. In some embodiments, if the communication is a personal message, the method 1000 may attempt to reduce a size of the communication by reducing superfluous words or rephrasing the communication.

The operation(s) at block 1005 may be performed using the generate module 305 described with reference to FIG. 3.

At block 1010, the method 1000 may include coding the communication using a locally stored code index. Coding the communication may reduce a size of the communication. The method 1000 may replace a word or phrase in the communication with a shorter coded message. For example, a phrase, command, or the like may be replaced with an alphanumeric character, a numeric character, or the like.

The operation(s) at block 1010 may be performed using the encode module 310 described with reference to FIG. 3.

At block 1015, the method 1000 may include transmitting the coded communication to the control panel. The communication may be transmitted using a wireless broadband network serviced by a cellular data plan provider. In some embodiments, if a size of the communication is greater than a predetermined threshold, the user may be alerted. For example, if the user is attempting to send a message to another user and the message is unable to be effectively coded to achieve an optimal size, the user may be alerted. The user may then have the option to send the message anyway, cancel the message, or reword the message to reduce a size.

The operation(s) at block 1015 may be performed using the transmit module 315 described with reference to FIG. 3.

Thus, the method 1000 may provide for reducing a size of communications between a control panel and a device relating to automation/security systems. It should be noted that the method 1000 is just one implementation and that the operations of the method 1000 may be rearranged or otherwise modified such that other implementations are possible.

Figure 11:
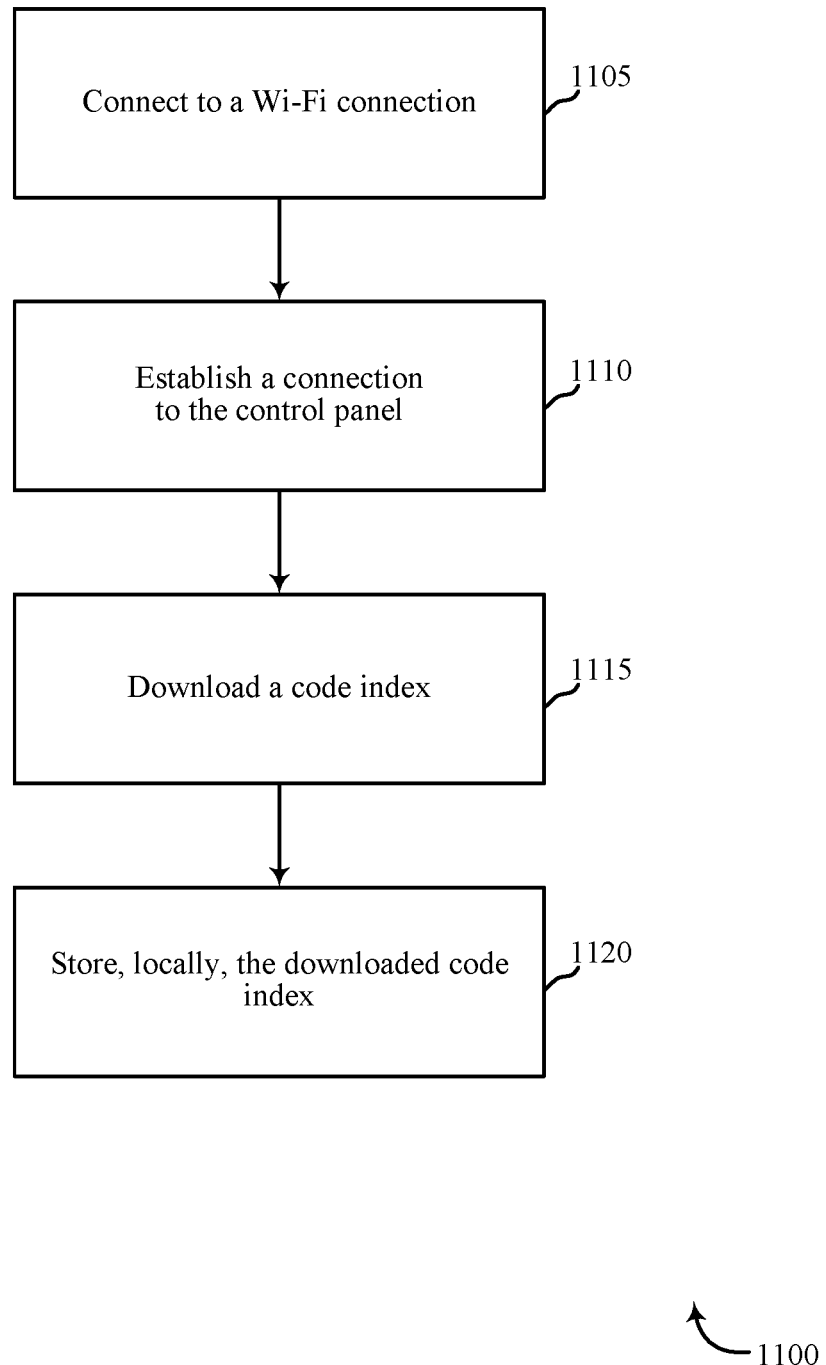
FIG. 11 is a flow chart illustrating an example of a method relating to a security and/or an automation system, in accordance with various aspects of this disclosure.

FIG. 11 is a flow chart illustrating an example of a method 1100 for reducing a size of communications between a control panel and a device, in accordance with various aspects of the present disclosure. For clarity, the method 1100 is described below with reference to aspects of one or more of the communication module 215 described with reference to FIG. 2, 3, or 5, and/or aspects of one or more of the code index module 545 described with reference to FIG. 5. In some examples, a mobile device may execute one or more sets of codes to control the functional elements of the mobile device to perform the functions described below. Additionally or alternatively, the mobile device may perform one or more of the functions described below using special-purpose hardware.

At block 1105, the method 1100 may include connecting to a Wi-Fi connection. At block 1110, the method 1100 may include establishing a connection to the control panel.

The operation(s) at block 1105 and 1110 may be performed using the transceiver module 530 and/or the antenna 535 described with reference to FIG. 5.

At block 1115, the method 1100 may include downloading a code index. The code index may be specific to the user and/or to the automation system. The code index may be generated by a control panel and pushed to the mobile device or the mobile device may ping the control panel for a new version of the code index or updates to the code index.

At block 1120, the method 1100 may include storing, locally, the downloaded coded index. For example, the method 1100 may execute on a device with a local memory (e.g. memory 510). The method 1100 may store the code index in the local memory to reduce data transfer using one or more wireless broadband networks.

The operation(s) at blocks 1115 and/or 1120 may be performed using the code index module 545 described with reference to FIG. 5.

Thus, the method 1100 may provide for reducing a size of communications between a control panel and a device relating to automation/security systems. It should be noted that the method 1100 is just one implementation and that the operations of the method 1100 may be rearranged or otherwise modified such that other implementations are possible.

Figure 12:
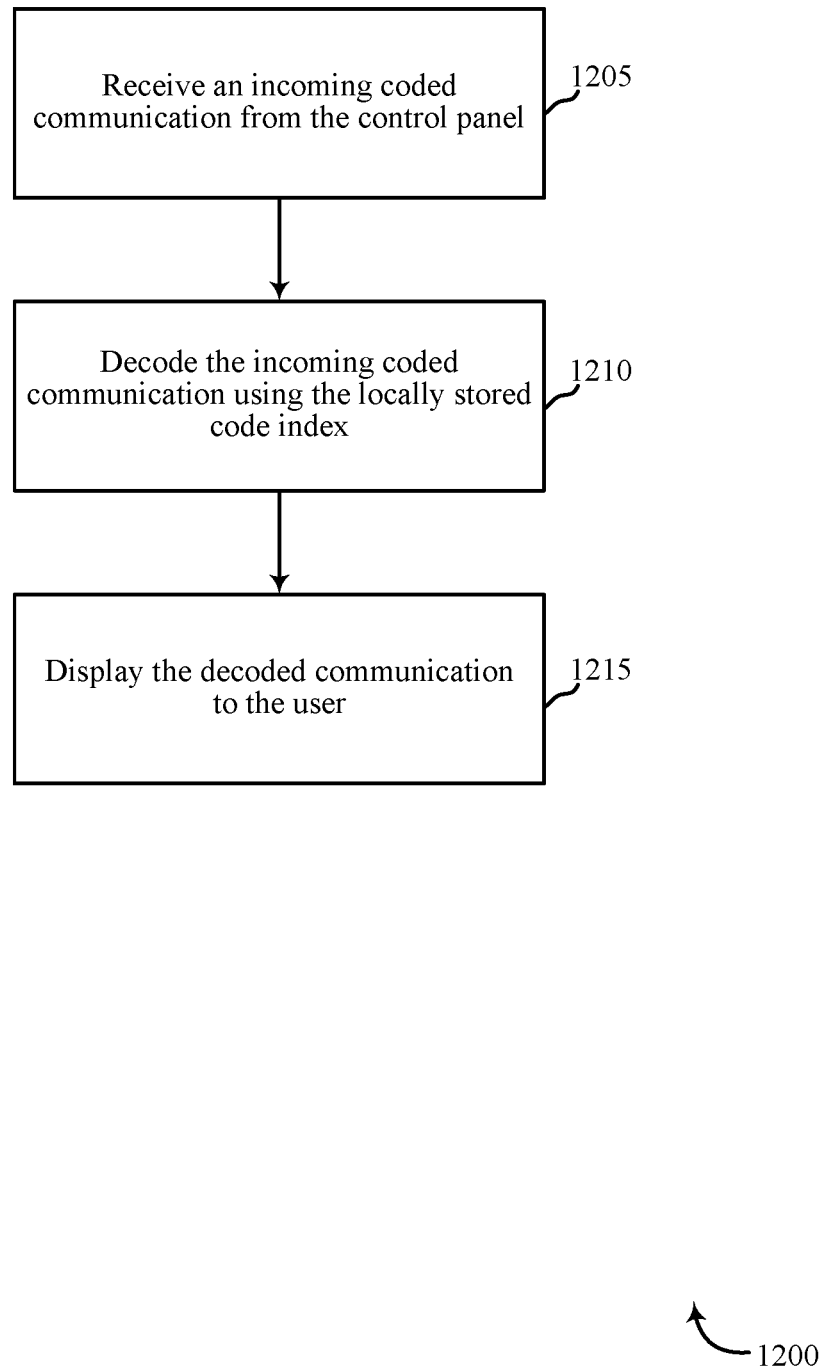
FIG. 12 is a flow chart illustrating an example of a method relating to a security and/or an automation system, in accordance with various aspects of this disclosure.

FIG. 12 is a flow chart illustrating an example of a method 1200 for reducing a size of communications between a control panel and a device, in accordance with various aspects of the present disclosure. For clarity, the method 1200 is described below with reference to aspects of one or more of the communication module 215 described with reference to FIG. 2, 3, or 5, and/or aspects of one or more of the code index module 545 described with reference to FIG. 5. In some examples, a mobile device may execute one or more sets of codes to control the functional elements of the mobile device to perform the functions described below. Additionally or alternatively, the mobile device may perform one or more of the functions described below using special-purpose hardware.

At block 1205, the method 1200 may include receiving an incoming coded communication from the control panel. The method 1200 may determine if the message is coded. For example, the message may not be in a readable format and/or an executable format.

The operation(s) at block 1205 may be performed using the receive module 320 described with reference to FIG. 3.

At block 1210, the method 1200 may include decoding the incoming coded communication using the locally stored code index. The coded communication may be transcribed into a readable format. The readable format may comprise a message to the user or an executable command on a mobile device. In some embodiments, the communication may comprise alphanumeric characters. The alphanumeric characters may represent one or more words, phrases, commands, and the like. The method 1200 may transform the message from a non-readable format to a readable format.

The operation(s) at block 1210 may be performed using the decode module 325 described with reference to FIG. 3.

At block 1215, the method 1200 may include displaying the decoded communication to the user. The decoded communication may be displayed as an SMS message, a voice message, an email, a ping message, a message within an application on the mobile device, or the like. In some embodiments, the communication may request one or more pieces of information from the user. For example, the communication may request the user to approve an action at the automation system, dismiss an alert, or the like.

The operation(s) at block 1215 may be performed using the execute module 330 described with reference to FIG. 3.

In some examples, aspects from two or more of the methods 900-1200 may be combined and/or separated. It should be noted that the methods 900-1200 are just example implementations, and that the operations of the methods 900-1200 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems, comprising:
  generating a communication to a user;
  determining a location of the user based on a Wi-Fi or broadband connection;
  coding the communication using a pre-established user-specific code index based at least in part on the location of the user, the code index comprising a catalog of codified words unique to the user and unique to a security and/or automation system associated with the user, the communication comprising a code identifier for identifying the code index utilized;
transcribing at least a portion of the coded communication into a readable medium, wherein the readable medium comprises a location or device type to transmit the coded communication to; and
transmitting the coded communication to a device associated with the user based at least in part on the Wi-Fi or broadband connection and transcribing the at least a portion of the coded communication into the readable medium.

2. The method of claim 1, wherein coding the communication further comprises:
reducing a size of the communication.

3. The method of claim 1, further comprising:
generating a code index, wherein the code index is user-specific.

4. The method of claim 2, further comprising:
determining when the device is connected to a wireless network comprising the broadband connection;
transferring the code index to the device associated with the user based at least in part on the determining.

5. The method of claim 1, further comprising:
receiving an incoming coded communication from the device; and
decoding the incoming coded communication using a code index.

6. The method of claim 5, further comprising:
transferring the decoded communication to a module within a control panel; and
executing, by the module, the decoded communication.

7. The method of claim 1, wherein the communication comprises one or more communications between the automation system and the user.

8. An apparatus for security and/or automation systems, comprising:
a processor;
memory in electronic communication with the processor; and
instructions stored in the memory, the instructions being executable by the processor to:
generate a communication to a user based on a Wi-Fi or broadband connection;
determine a location of the user;
code the communication using a pre-established user-specific code index based at least in part on the location of the user, the code index comprising a catalog of codified words unique to the user and unique to a security and/or automation system associated with the user, the communication comprising a code identifier for identifying the code index utilized;
transcribe at least a portion of the coded communication into a readable medium, wherein the readable medium comprises a location or device type to transmit the coded communication to; and
transmit the coded communication to a device associated with the user based at least in part on the Wi-Fi or broadband connection and transcribing the at least a portion of the coded communication into the readable medium.

9. The apparatus of claim 8, wherein the instructions executable by the processor to code the communication further comprise:
reducing a size of the communication.

10. The apparatus of claim 8, wherein the instructions are executable by the processor to:
receive an incoming coded communication from the device; and
decode the incoming coded communication using a code index.

11. The apparatus of claim 8, wherein the instructions are executable by the processor to:
generate a code index, wherein the code index is user-specific.

12. The apparatus of claim 11, wherein the instructions are executable by the processor to:
determine when the device is connected to a wireless network comprising the broadband connection;
transfer the code index to the device associated with the user based at least in part on the determining.

13. The apparatus of claim 8, wherein the instructions are executable by the processor to:
receive an incoming coded communication from the device; and
decode the incoming coded communication using a code index.

14. The apparatus of claim 13, wherein the instructions are executable by the processor to:
transfer the decoded communication to a module within a control panel; and
execute, by the module, the decoded communication.

15. A method for security and/or automation systems, comprising:
generating a communication to a control panel;
determining a location of a user based on a Wi-Fi or broadband connection;
coding the communication using a pre-established user-specific locally stored code index based at least in part on the location of the user, the code index comprising a catalog of codified words unique to a user and unique to a security and/or automation system associated with the user, the communication comprising a code identifier for identifying the code index utilized;
transcribing at least a portion of the coded communication into a readable medium, wherein the readable medium comprises a location or device type to transmit the coded communication to; and
transmitting the coded communication to the control panel based at least in part on the Wi-Fi or broadband connection and transcribing the at least a portion of the coded communication into the readable medium.

16. The method of claim 15, further comprising:
connecting to the Wi-Fi connection;
establishing a connection to the control panel;
downloading a code index; and
storing, locally, the downloaded code index.

17. The method of claim 15, further comprising:
connecting to the Wi-Fi connection;
establishing a connection to the control panel;
updating the locally stored code index.

18. The method of claim 15, wherein coding the communication further comprises:
reducing a size of the communication.

19. The method of claim 15, further comprising:
receiving an incoming coded communication from the control panel; and
decoding the incoming coded communication using the locally stored code index.

20. The method of claim 19, further comprising:
displaying the decoded communication to the user.

* * * * *